(12) United States Patent
Buxton et al.

(10) Patent No.: US 11,321,022 B2
(45) Date of Patent: May 3, 2022

(54) SYSTEMS AND METHODS FOR SCHEDULING FLASH OPERATIONS

(71) Applicant: Kioxia Corporation, Tokyo (JP)

(72) Inventors: Neil Buxton, San Jose, CA (US); Gary James Calder, San Jose, CA (US)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 16/731,766

(22) Filed: Dec. 31, 2019

(65) Prior Publication Data
US 2021/0200481 A1   Jul. 1, 2021

(51) Int. Cl.
*G06F 3/06* (2006.01)
*G06F 9/4401* (2018.01)

(52) U.S. Cl.
CPC .......... *G06F 3/0679* (2013.01); *G06F 3/0616* (2013.01); *G06F 3/0625* (2013.01); *G06F 3/0652* (2013.01); *G06F 3/0659* (2013.01); *G06F 9/4418* (2013.01)

(58) Field of Classification Search
CPC .... G06F 3/0616; G06F 3/0625; G06F 3/0652; G06F 3/0659; G06F 3/0679; G06F 9/4418; G06F 3/0611; G06F 12/0246; G06F 2212/1008; G06F 2212/1024; G06F 2212/1028; G06F 2212/7201; G06F 2212/7203; G06F 2212/7205; G06F 2212/7208; Y02D 10/00
See application file for complete search history.

(56) References Cited

U.S. PATENT DOCUMENTS

| | | | | |
|---|---|---|---|---|
| 9,418,712 | B1 * | 8/2016 | Erez | G06F 3/0688 |
| 2001/0011318 | A1 * | 8/2001 | Dalvi | G11C 16/26 |
| | | | | 711/103 |
| 2013/0318371 | A1 * | 11/2013 | Hormuth | G06F 1/28 |
| | | | | 713/320 |
| 2018/0335978 | A1 * | 11/2018 | Tidwell | G06F 3/0688 |
| 2019/0043593 | A1 * | 2/2019 | Guo | G06F 3/06 |
| 2019/0065086 | A1 * | 2/2019 | Margetts | G06F 3/0659 |

* cited by examiner

*Primary Examiner* — Larry T Mackall
(74) *Attorney, Agent, or Firm* — Foley & Lardner LLP (57) ABSTRACT

Various implementations described herein relate to systems and methods for a solid state drive (SSD) that includes requesting power credits while performing a program or erase operation for a flash memory of the SSD. In response to determining that the requested power credits are rejected, the program or erase operation is suspended and its power credits are released. A read operation may then be performed in response to suspending the program or erase operation and releasing its power credits.

20 Claims, 6 Drawing Sheets

SYSTEMS AND METHODS FOR SCHEDULING FLASH OPERATIONS

TECHNICAL FIELD

The present disclosure generally relates to power management in solid state drives (SSDs), and particularly, to systems and methods for scheduling flash operations (e.g., read operations, write operations, erase operations, and so on).

BACKGROUND

An SSD can provide storage capabilities for a host, for example, in a datacenter, a cloud storage center, and so on. A read operation is an input/output (I/O) operation that allows data stored on a flash memory (e.g., a NAND memory array) of the SSD to be retrieved and read by the host. In general, read operations are preferred to be fast and predictable given that applications running on hosts may require faster response times for read operations. Accordingly, data needs to be read from the flash memory in a timely manner. Although read operations are in general faster as compared to other types of flash operations, in some situations, a read operation can be stalled (e.g., blocked or delayed) in memory channel queues due to program or erase operations previously scheduled and/or power credit starvation.

SUMMARY

In certain aspects, the present implementations of a SSD device includes a controller and a flash memory device including a plurality of memory banks. The controller schedules a suspendable operation to the flash memory device, the suspendable operation consuming first power credits. The controller further requests second power credits while the flash memory device performs the suspendable operation. In response to determining that the requested second power credits are not granted, the controller suspends the suspendable operation and releases the first power credits of the suspendable operation. The controller schedules a read operation in response to releasing the first power credits of the suspendable operation. In response to determining that the requested second power credits are granted, the controller releases the second power credits and suspendable operation continues.

In some implementations, the controller releases power credits representing power consumed by a suspendable operation while one of the plurality of memory banks performs the suspendable operation, re-requests the power credits. In response to determining that the re-requested power credits are not granted, the controller suspends the suspendable operation and schedules a read operation in response to releasing the power credits. In response to determining that the re-requested power credits are granted, the suspendable operation is resumed or continues.

DETAILED DESCRIPTION

In some implementations, an SSD includes a flash memory (e.g., a non-volatile memory array) having a plurality of NAND devices organized into memory banks that can process commands and flash operations, where each memory bank corresponds to one or more memory NAND die. The SSD includes multiple memory channels, each of which is operatively coupled to one or more of the memory banks. Flash operations (NAND operations, I/O operations, memory operations, or so on) refer to operations such as but not limited to, read operations, write (program) operations, erase operations, and so on. A power management system (e.g., a power manager) of an SSD can implement a budget system to manage or constrain power consumption in the SSD, with respect to the power consumed by the flash operations in the memory banks. In some examples, flash operations can be placed in a memory channel queue and are executed in sequence based on a power budget. In other words, power consumption in an SSD can be managed by controlling the scheduling of the flash operations. In some implementations, the power budget can be set by factors such as but not limited to the host computer determined power level, thermal limits, power circuitry limits, and so on.

In some implementations, the power budget is a number representing total power provided to a flash memory of an SSD, for all memory banks connected to multiple memory channels to consume. A power credit (or power cost) is assigned to each flash operation executable with respect to the flash memory (e.g., sent or scheduled to the memory banks). A current power level is a sum of the power credits across all flash operations currently being executed for all memory banks on all memory channels. The total power credits for a given memory channel corresponds to a sum of power credits for all flash operations currently being executed on the memory banks operatively coupled to that memory channel. The current power level is the sum of such total power credits for all memory channels. Responsive to each flash operation being scheduled to a given memory bank on a given memory channel, the power credit for each flash operation is added together to determine the current power level. Available power is a number representing a current available power for executing additional flash operations in the memory channel queue. The available power can be determined by subtracting the current power level from the power budget. In some examples, a flash operation is scheduled (e.g., by a scheduler) in response to determining that a power cost (e.g., the power credit) of that flash operation is less than or equal to the available power at the moment. In response to determining that a flash operation is completed, the power credit for that flash operation is subtracted from the current power level or added to the available power.

As described, flash operations can be inserted into a memory channel queue. A scheduler fetches a head of the memory channel queue (e.g., a next flash operation in the memory channel queue that needs to be scheduled) and sends a request for specified power credits corresponding to that flash operation to the power manager. In response to the request being granted, the scheduler schedules the flash operation on the memory channel. In response to determining that the request is not immediately granted, the memory operation remains outstanding in the queue until the available power becomes sufficient for the memory operation (e.g., until the power credit for that flash operation is less than or equal to the available power), at which point the request is granted by the power manager.

Such power management mechanism can cause some flash operations (e.g., high priority read operations that are typically latency-intolerant) to suffer excessive and intolerable delays as such flash operations stand by and wait for the available power to become sufficient. Such delays can be exacerbated in situations in which an application I/O profile (e.g., mixed R/W profile) includes to a high proportion of write operations while the SSD is operating close to full power (low available power) for a high proportion of the time. The SSD operates close to full power due to a large percentage of the memory banks being occupied processing both program operations due to the original host write activities and also program or erase operations due to garbage collection activities, resulting in all or almost all of the available power being consumed. Typically, a program or erase operation can take from one to two orders of magnitude longer than a read operation. In this case, a read operation at top of the queue cannot be scheduled and needs to wait until one or more previously scheduled operations complete and power credits for the one or more previously scheduled operations are released. Thus, such power management mechanism can cause power hunger, with low priority operations (e.g., program or erase operations) stalling high-priority and latency-intolerant operations such as read operations due to power credit starvation. Accordingly, a host may experience high read latencies at times of high power consumption caused by such power management mechanism. Such high read latencies are similar to those experienced by the host in connection with a read operation waiting for a program or erase operation to complete on a same memory bank due to lack of available power, given that in some instances, only one active operation can be performed in a memory bank at any given time.

Host read operations suffer disproportionately from this issue because write operations are buffered in volatile memory such as random-access memory (RAM) as the write operations are received from the host. The write operations are acknowledged immediately responsive to being buffered, with one exception being write operations that specify Force Unit Access, which must be persisted to non-volatile media before acknowledgement. Read operations, on the other hand, must complete a read access to media, which may be a RAM buffer cache or the persistent non-volatile media before the read data is returned with the operation acknowledgement. Host read operations that do not result in a cache hit will therefore be placed in the queue for a memory channel and may therefore be subject to excessive delays resulting from the starvation of power credits due to an excess of program or erase operations while operating close to the power limit of the SSD.

The present disclosure relates a controller of an SSD that queues flash operations for a flash memory of the SSD, where the controller pro-active checks for program or erase suspends to prevent read operations from stalling as a result of lack of power caused by power credit counting when the SSD is operating close to its total power budget. Accordingly, maximum latency of a read operation can be improved in the event of the SSD operating close to its maximum power limit.

Figure 1:
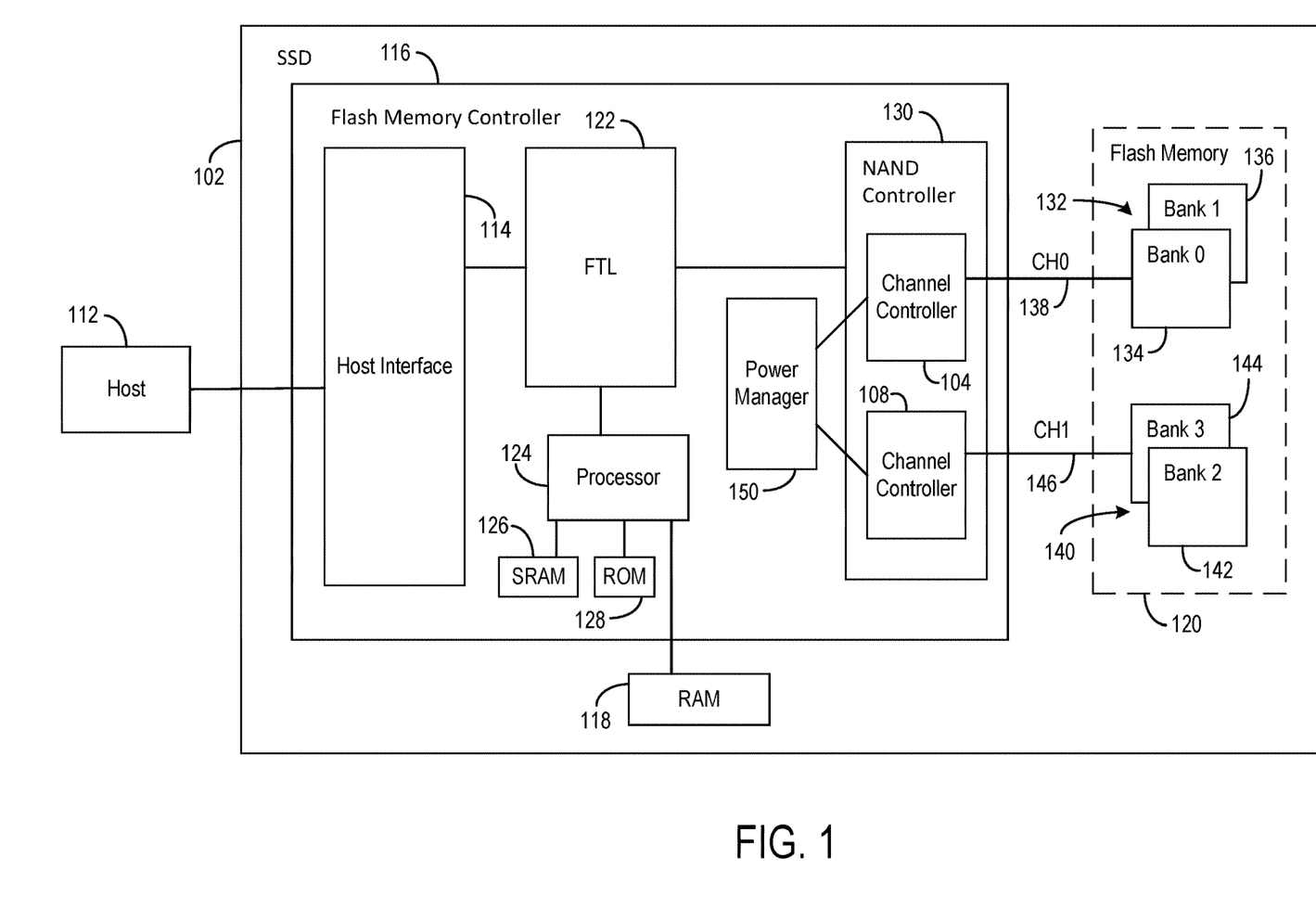
FIG. 1 is a block diagram showing an example SSD, according to some implementations.

FIG. 1 shows a block diagram that schematically illustrates a structure of an SSD 102, in accordance with some implementations. The SSD 102 is operatively coupled to a host 112.

The host 112 (e.g., a host device such as a personal computer) connects to the SSD 102 via a host interface 114, which conforms to a storage interface standard. The SSD 102 functions as an internal or external storage device of the host 112, in some examples. Examples of the communication interface standard implemented for the host interface 114 include standards such as but not limited to, Serial Advanced Technology Attachment (SATA), Serial Attached SCSI (SAS), Peripheral Components Interconnect Express (PCIe), and so on.

The SSD 102 includes a flash memory controller 116, a random access memory (RAM) 118, and flash memory 120. The flash memory controller 116 includes the host interface 114, a flash translation layer (FTL) 122, a processor 124, a static random access memory (SRAM) 126, a read-only memory (ROM) 128, and a NAND controller 130. The NAND controller 130 includes a first channel controller 104 and a second channel controller 108. The flash memory 120 includes one or more NAND devices, each of which is composed of multiple banks of die coupled to the NAND controller 130 by a channel. The flash memory 120 includes a first NAND device group 132 having a first bank (Bank 0) 134 and a second bank (Bank 1) 136. The banks 134 and 136 are coupled to the channel controller 104 via a first memory channel 138. The flash memory 120 includes a second NAND device group 140 having a third bank (Bank 2) 142 and a fourth bank (Bank 3) 144. The banks 142 and 144 are coupled the channel controller 108 via a second memory channel 146.

The flash memory 120 includes non-volatile (non-transitory) NAND memory devices (e.g., the first NAND device group 132 and the second NAND device group 140) configured to store data. The flash memory controller 116 performs (executes) data transfer control on the SSD 102. The flash memory controller 116 controls the RAM 118 (e.g., a volatile storage) to temporarily store data transferred from the host 112 to the flash memory 120, before the data is written to the dies of the flash memory 120. The RAM 118 functions as a data cache memory of the flash memory 120, and can be one or more of Dynamic Random Access Memory (DRAM), Ferroelectric Random Access Memory (FeRAM), Magnetoresistive Random Access Memory (MRAM), and so on.

The processor 124 in the flash memory controller 116 executes boot code in the ROM 128, transferring control to FTL firmware running in the SRAM 126 to manage the interchange of data between the host interface 114 and the NAND controller 130 via the RAM 118.

The flash memory controller 116 interfaces with the flash memory 120 by one or more flash memory buses, such as but not limited to the memory channels 138 and 146. Although the SSD 102 includes two memory channels (the first memory channel (CH0) 138 and the second memory channel (CH1) 146), other examples of the SSD can include one or multiple (e.g., 8, 16, or more) memory channels. One or more NAND memory devices (banks) each having one or more memory dies can be coupled to each memory channel.

Dies or devices can be grouped together into banks which are independently selectable by a memory channel controller using chip enable signals. Although the SSD 102 includes two banks per memory channel, other examples of the SSD can include one or more (e.g., 8, 16, or more) banks per memory channel.

The NAND controller 130 includes a channel controller 104 or 108 operatively coupled to a respective one of the memory channels 138 and 146. The channel controller 104 includes scheduler logic (e.g., a scheduler) that controls scheduling of memory commands (e.g., flash operations) issued to the banks 134 and 136 coupled to the memory channel 138. The channel controller 108 includes scheduler logic (e.g., a scheduler) that controls scheduling of memory commands (e.g., flash operations) issued to the banks 142 and 144 coupled to the memory channel 146.

The channel controllers 104 and 108 each contains logic that provides bit operation and support logic for bank selection within the scheduler of each of the channel controllers 104 and 108. Such logic can be hardware-implemented logic blocks including logic gates and direct hardware inputs indicating statuses of the banks 134, 136, 142, and 144 and the memory channels 138 and 146. The logic enables the schedulers to schedule flash operations to be transmitted or sent to the banks 134, 136, 142, and 144 in order to efficiently use the memory channels 138 and 146.

The channel controllers 104 and 108 use the logic to determine a sequence in which flash operations from the host 112 are transmitted to the banks 134, 136, 142, and 144 via the memory channels 138 and 146. The hardware-implemented logic can quickly identify a bank to which a flash operation is sent over a shared memory channel, because the hardware-implemented logic can efficiently handle multitude of variables and conditions, increasing the efficiency of command processing and scheduling.

A command cycle includes a sequence of periods or zones. A first period is an address and command setup, followed by data transfer in cases of a write command (a program operation). This is followed by an inactive period in which the command is internally processing in the bank. The final period is a status or response from the bank.

Because some commands, for example a write command, includes a high-latency inactive period, a write command can be sent over the memory channel 138 to the bank 134, and additional commands can be sent over the memory channel 138 to another bank (e.g., the bank 136) while the first bank 134 executes the command (e.g., performs the flash operation corresponding to the command). Interleaving the commands transmitted over the same channel in this manner enables the SSD 102 to process commands more efficiently because multiple banks can independently execute commands simultaneously using a shared memory channel. Though only one command can be transmitted, or data transferred, over the memory channel at any given time, additional commands can be sent to other banks in sequence while a first bank is busy executing a command, as long as the bus data transfer zones of the commands cycles do not overlap.

For a write command transmitted to the bank 134, data to be written is presented from the NAND controller 130 (the channel controller 104) to the bank 134 over the memory channel 138. Responsive to receiving the write command, the bank 134 begins to write the data. While the data is being written, the bank 134 is busy, but the memory channel 138 may not be busy. More particularly, writing the data may take from several hundred microseconds up to several milliseconds to complete, during which the memory channel 138 is not busy. Data is written to the flash memory 120 in units of pages using a page program command. The time taken to write the data using the page program command is referred to as tPROG. The logic of the channel controller 104 determines the latency time for the bank 134 during the data writing execution and determines if an additional command can be sent to another bank coupled to the channel controller 104 over the memory channel 138 during this time, thus increasing efficiency by minimizing the time that the memory channel 138 is idle. The second bank scheduler 108 functions similarly.

In some examples, while the data is being written by the bank 134, the logic of the channel controller 104 determines that for tPROG, the bank 134 cannot accept additional commands, but other banks (e.g., the bank 136) in the first NAND device group 132 can accept commands over the memory channel 138. The scheduler of the channel controller 104 can set a timer to indicate that tPROG remains in the latency period for the bank 134. The logic of the channel controller 104 can consult a queue of commands for additional banks (e.g., the bank 136) in the first NAND device group 132 and selects one of those banks (e.g., the bank 136) to transmit a subsequent command or flash operation over the memory channel 138 while the bank 134 is writing data. The subsequent command or flash operation to be transmitted may be selected by the scheduler of the channel controller 104 based on a plurality of hardware signals related to the status of the queues and the status of the banks. The subsequent command or flash operation may be a read command/operation to be transmitted to the bank 136. The scheduler of the channel controller 104 then transmits the read command to the bank 136 over the memory channel 138. The read command is executed by the bank 136 and a completion signal may be transmitted back over the memory channel 138. A completion signal for the write command being executed by the bank 134 may then be received over the memory channel 138, or additional commands may be transmitted to the bank 136 based on the determinations of the logic of the channel controller 104.

In some examples, the scheduler of the channel controller 104 can also determine that for scheduled erase operations being performed by the banks 134 and 136 (which may take several milliseconds to complete the scheduled erase operations), it may be possible to transmit subsequent commands or flash operations over the memory channel 138 to other banks on the same channel (e.g. the bank 136). A subsequent command or flash operation to be transmitted may be selected by the scheduler of the channel controller 104 based on a plurality of hardware signals related to the status of the queues and the status of the banks 134 and 136. In one example, the subsequent command or flash operation can be a read command/operation to be transmitted to the memory bank 136.

While the scheduling of subsequent commands or operations to banks other than the bank performing program or erase operations may be possible, it still remains a problem that subsequent commands or operations to the bank performing a program or erase operation are not possible until the program or erase operation has completed. For this reason, the flash memory 120 has been improved to enable the flash memory controller 116 to issue commands to suspend and resume a previously scheduled operation. Operations which may be suspended and resumed are referred to herein as "suspendable operations" and include, but are not limited to, program and erase operations.

The implementations described herein improve the usage of suspending and resuming suspendable operations to enable pending read operations to be scheduled, where such read operations may otherwise be stalled or blocked, particularly when the SSD 102 is operating at close to the available power budget.

In some implementations, the flash memory controller 116 includes a power manager 150 to manage power of the SSD 102 using the budget system. The power manager 150 can be operatively coupled to the channel controllers 104 and 108 to allow or reject flash operations based on currently available power. For example, a channel controller (e.g., the channel controllers 104 and 108) can send, via a suitable communication bus or port, a request for power credits for a flash operation (e.g., a read operation/command, a program (write) operation/command, an erase operation/command, and so on) to the power manager 150. The power manager 150 can determine, based on the budget system, whether sufficient power is available for the flash operation, and sends a grant message in response to determining that sufficient power is available for the flash operation. The channel controller determines that the requested power credits are granted by the power manager 150 in response to receiving the grant message from the power manager 150.

In some examples, the power manager 150 determines a summation function, an example of which is shown below:

$$\text{Available Power} = \text{Power Budget} - \text{Current Power Level} \quad (1)$$

The available power can be determined by subtracting the current power level from the power budget. In some examples, a flash operation is allowed by the power manager 150 in response to determining that a power cost (e.g., the power credit) of that flash operation is less than or equal to the available power at the moment. In response to determining that a flash operation is completed, the power credit for that flash operation is subtracted from the current power level or added back to the available power. For example, a channel controller can send a release notification to the power manager 150 indicating that the channel controller releases the power credits for a given flash operation.

The scheduler of each of the channel controllers 104 and 108 maintains a memory channel queue including flash operations, such that the flash operations placed in the memory channel queue are executed in sequence based on the power budget.

Figure 2A:
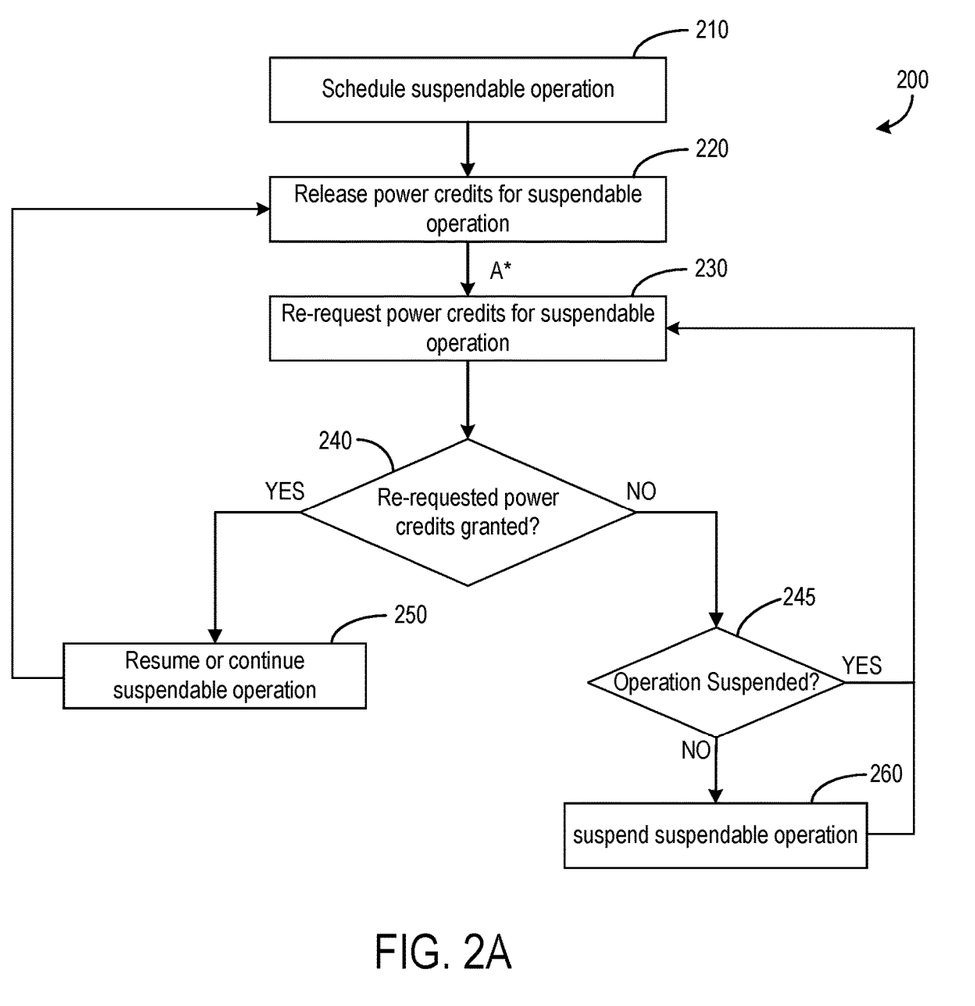
FIG. 2A is a flow diagram illustrating an example process for scheduling flash operations in an SSD, according to some implementations.
Figure 3:
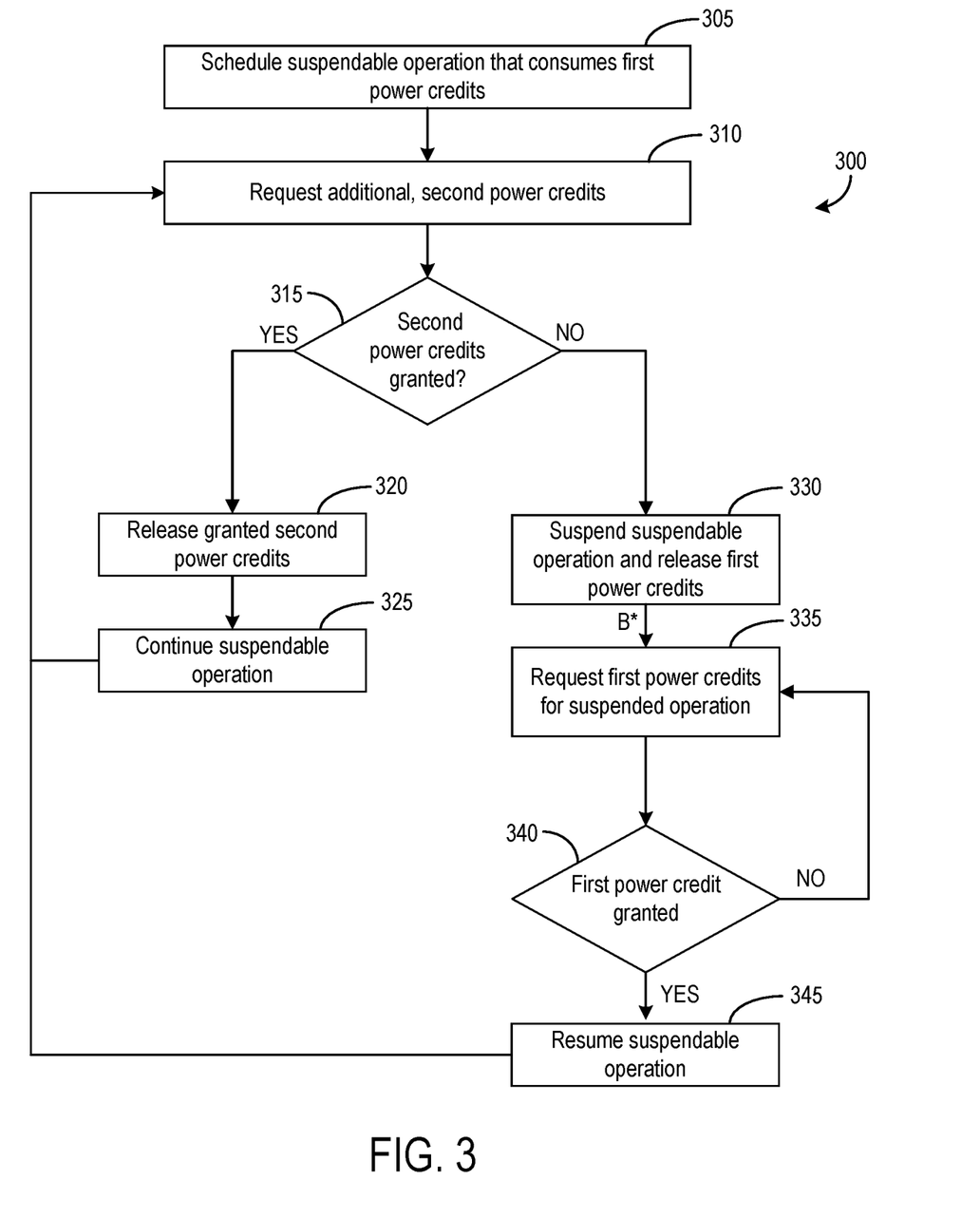
FIG. 3 is a flow diagram illustrating an example process for scheduling flash operations in an SSD, according to some implementations.

In some implementations, to address read operations being stalled in memory channel queues due to a large number of program or erase operations and/or power credit starvation, a channel controller can employ the process 200 (FIG. 2A) or the process 300 (FIG. 3). The processes 200 and 300 can be implemented by the channel controller 104 without needing the channel controller 104 to have knowledge of desired and current power usage of other memory channels (e.g., the channel 146 coupled to the channel controller 108) in the SSD 102. Given that each channel controller in the SSD 102 does not require knowledge of the power requirements of other channel controllers in the SSD 102, the budget system utilized by the power controller 150 can remain simple. While FIGS. 2A-5 are described with reference to the channel controller 104, another channel controller (e.g., the channel controller 108) of the SSD 102 can likewise implement the mechanisms described with reference to FIGS. 2A-5 with regard to memory channel(s)/bank(s) operatively coupled to those channel controllers.

FIG. 2A is a flow diagram illustrating an example process 200 for scheduling flash operations in the SSD 102 (FIG. 1), according to some implementations. Referring to FIGS. 1-2A, in the process 200, the channel controller 104 periodically releases power credits for a suspendable operation (e.g., a program or erase operation) to the power manager 150 while the suspendable operation is being performed and then immediately re-requests those power credits from the power manager 150. In doing so, any read operations stalled by the suspendable operation due to lack of available power credits can use some of the power credits freed as the channel controller 104 releases the power credits for the suspendable operation. In that case, the re-request may fail as there will be fewer available power credits due to the power credits used by the read operation, and in that event, the channel controller 104 suspends the suspendable operation. In response to the suspension completing, the channel controller 104 return to 230 and re-requests power credits for the suspendable operation and continues to do so until the requested power credits are granted. In response to the requested power credits being granted, the channel controller 104 resumes the suspendable operation and returns to 220 to release the power credits for the suspendable operation. In this way, the release and re-request of power credits for the suspendable operation (e.g., at 220 and 230) is performed periodically until the suspendable operation either completes or reaches a point where suspending the suspendable operation would incur a latency shorter than the time taken to perform any read operation (at which point the suspendable operation is allowed to complete without suspension).

At 210, the channel controller 104 schedules a suspendable operation. The suspendable operation is performed by a memory bank 134 or 136 operatively coupled to the channel 138. In some examples, the suspendable operation is a program (write) operation in which the channel controller 104 programs or writes data to one or more pages of one or more of the memory banks 134 and 136 operatively coupled to the channel controller 104 via the memory channel 138. In some examples, the suspendable operation is an erase operation in which the channel controller 104 erases data from one or more blocks of one or more of the memory banks 134 and 136.

The suspendable operation consumes a given amount of power credits. Before the suspendable operation can be scheduled at 210, the channel controller 104 sends a request for the power credits for the suspendable operation to the power manager 150. The channel controller 104 determines that the requested power credits are granted by the power manager 150 in response to receiving a grant message from the power manager 150 indicating that the requested power credits have been granted by the power manager 150. The suspendable operation can be scheduled in response to determining that the requested power credits are granted.

At 220, the channel controller 104 releases the power credits for the suspendable operation while the suspendable operation is being performed. That is, after the suspendable operation is scheduled at 210 and before the suspendable operation completes, the channel controller 104 releases the power credits that represent power consumed by the suspendable operation. For example, before the suspendable operation completes (while it is being performed by the memory bank 134 or 136), the channel controller 104 sends a release notification to the power manager 150 indicating that the channel controller 104 releases the power credits for the suspendable operation. As described herein, blocks 220, 230, 240 and 250 (collectively referred to as a "loop") can be performed periodically while the suspendable operation is being performed (before the operation completes), without any interruption of the suspendable operation itself being performed by the memory bank 134 or 136.

At 230, the channel controller 104 re-requests the released power credits. The released power credits are re-requested immediately after block 220 (without delay) or after some short suitable delay in order to give some time for any queued read operation to be granted any requested power credits, which may occur at a time between blocks 220 and 230. The time at which the read operation is granted the power credits is denoted by A*. For example, the channel controller 104 sends a request to the power manager 150 indicating that the channel controller 104 is re-requesting the power credits for the suspendable operation, before the suspendable operation completes.

At 240, the channel controller 104 determines whether the re-requested power credits are granted by the power manager 150. For example, the channel controller 104 determines that the re-requested power credits are granted by the power manager 150 in response to receiving a grant message from the power manager 150 indicating that the re-requested power credits have been granted by the power manager 150. The re-request being granted indicates that sufficient power credits are left in the available power to be used for additional flash operations, such that it is unlikely that a read operation or other types of flash operations are being stalled while the suspendable operation is being performed. If the suspendable operation has not actually been suspended at the point, the suspendable operation continues as normal without any interruption.

On the other hand, the channel controller 104 determines that the re-requested power credits are not granted by the power manager 150 in response to receiving a rejection message from the power manager 150 indicating that the re-request has been rejected and the re-requested power credits have not been granted by the power manager 150. The re-request being rejected indicates that the SSD 102 is operating at or close to the power budget, such that it is likely that a read operation or other types of flash operations are being stalled while the suspendable operation is being performed and that one or more such operations have been granted power credits at point A* (therefore there are no longer sufficient power credits for the suspendable operation to continue).

By releasing and re-requesting the power credits for the suspendable operation, the channel controller 104 provides the opportunity for sufficient power credits to be granted to any read or other low-power and/or high-priority operations that may be stalled while waiting for credits. the channel controller 104 releases and re-requests the power credits for the suspendable operation without interrupting the suspendable operation itself, unless there are operations stalled while waiting for power credits, in which case those stalled operations may be granted power credits and the re-request for power credits for the suspendable operation may not be granted.

In response to determining that the re-requested power credits are granted (240:YES), the channel controller 104 resumes or continues the suspendable operation, at 250 and returns to 220 where the process repeats. In other words, in response to determining that the re-requested power credits are granted (240:YES), the suspendable operation is not suspended/interrupted. Accordingly, the channel controller 104 can check if any read or other low power and/or high priority operation is stalled without actually suspending the suspendable operation. The method 200 returns to block 220 after block 250, such that the channel controller 104 performs the loop of 220,230,240 and 250 and periodically releases and re-requests the power credits for the suspendable operation while the suspendable operation is being performed. In some implementations the loop natural frequency may be changed by inserting one or more time delays between two or more of the blocks 220,230,240 and 250, thus adjusting the periodicity.

On the other hand, in response to determining that the re-requested power credits are not granted (240:NO), the channel controller 104 first checks if the suspendable operation is already suspended, at 245. In response to determining that the suspendable operation is not suspended (245:NO), the channel controller 104 suspends the suspendable operation, at 260. The channel controller 104 suspends the suspendable operation by using a suspend command. In response to the suspendable operation being suspended, or the suspendable operation being already suspended (245:YES), the channel controller 104 returns to re-requesting power credits for the suspendable operation at 230.

In some examples, there may be a latency associated with suspending and/or resuming a suspendable operation such that the channel controller 104 can perform a calculation using an estimated remaining time of execution of a previously scheduled suspendable operation prior to actually suspending the suspendable operation. This is so that the channel controller 104 can determine whether it is more expedient to allow a suspendable operation to continue uninterrupted to completion than suspend the suspendable operation. Conditions under which it may be more expedient to allow the suspendable operation to continue include the suspend latency time exceeding the estimated remaining time of execution and an estimated time of execution of the read operation exceeding the estimated remaining time of execution. In response to determining that either of such conditions are met, the suspension of the suspendable operation is skipped, and the suspendable operation is allowed to continue to completion. The process 200 for a given suspendable operation ends when the suspendable operation finally completes.

Figure 2B:
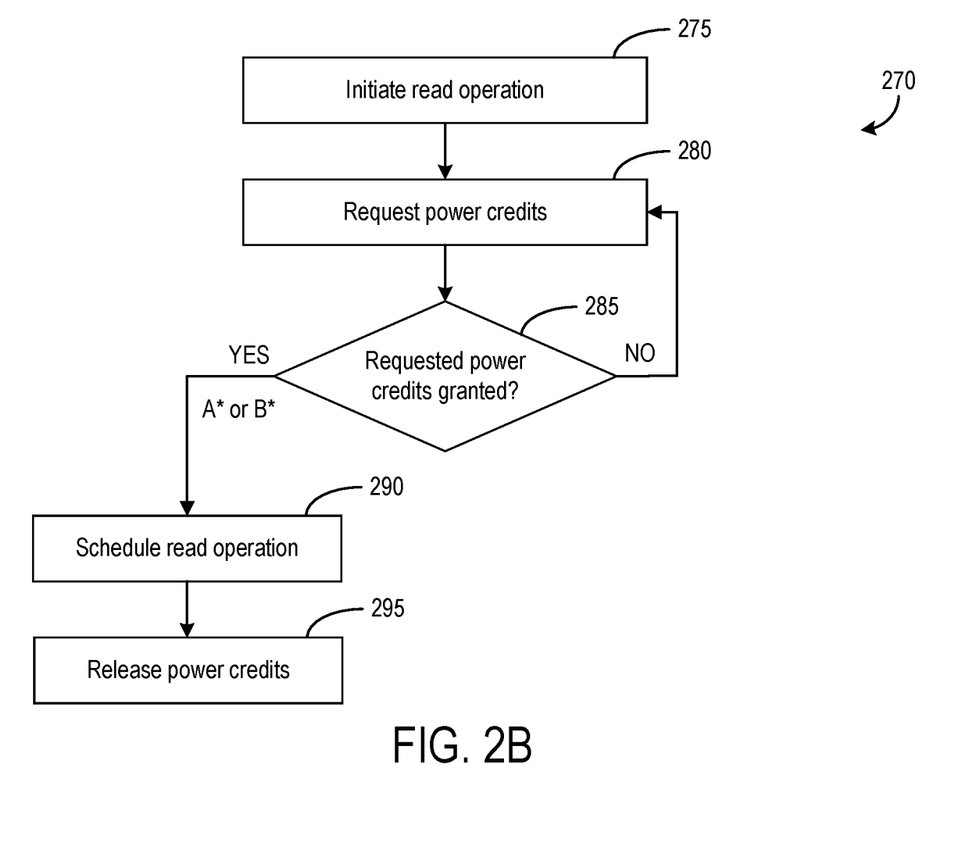
FIG. 2B is a flow diagram illustrating an example read operation, according to some implementations.

FIG. 2B shows a flow diagram of a read operation according to some implementations. Referring to FIGS. 1-2B, in the process 270, the channel controller 104 initiates a read operation taken from a queue at 275. The power credits required to schedule the read operation are requested from power manager 150 at 280. In response to the request being rejected and no power credits being granted (285:No), the channel controller 104 returns to requesting the power credits, at 280. The channel controller 104 may remain in a loop including blocks 280 and 285, for example, during period of high write activity when the SSD 102 is operating close to the power budget. While remaining in the loop, the read command suffers additional latency. This cycle may be broken when sufficient power credits become available due to the natural completion of other commands previously scheduled by channel controller 104, but this may result in excessive and unacceptable latency. To avoid this latency, power credits are released in the process 200 for a suspendable command shown in FIG. 2A at the point denoted by A*, which corresponds to point A* in FIG. 2B when power credits become granted. Therefore, the power credits being released in block 220 (FIG. 2A) following the scheduling of a suspendable operation may result in power credits being granted (285:Yes, FIG. 2B) for a read operation stalled in the loop of blocks 280 and 285 in FIG. 2B. By suitable adjustment of the periodicity of releasing/re-requesting power credits (at blocks 220 and 230 in FIG. 2A), the maximum latency of any read command waiting in the loop of blocks 280 and 285 in FIG. 2B can be controlled.

In response to the power credits being granted (285:Yes), the channel controller 104 schedules the read operation at 290. Once the read operation completes, the channel controller 104 releases the power credits of the read operation, at 295.

FIG. 3 is a flow diagram illustrating an example process 300 for scheduling flash operations in the SSD 102 (FIG. 1), according to some implementations. Referring to FIGS. 1-3, in the process 300, the channel controller 104 performs a suspendable operation which consumes power credits (referred as "first power credits") and periodically requests additional power credits (referred as "second power credits") from the power manager 150 during the suspendable operation. If the request is granted, the second power credits are released immediately, and the suspendable operation continues (with no interruption). On the other hand, the request being rejected indicates that the SSD 102 is operating close to the power budget, meaning that some read operations may be stalled while in the memory channel queue (e.g. in the process 270 at blocks 280, 285 in FIG. 2B). In response to determining that the request is rejected, the channel controller 104 identifies the suspendable operation that is currently running and suspends the identified suspendable operation and releases the first power credits, thus making the released first power credits available for any stalled read operation. The channel controller 104 then requests the first power credits for the suspended suspendable operation. In response to determining that the power manager 150 grants the request, the channel controller 104 resumes the suspendable operation.

At 305, the channel controller 104 schedules a suspendable operation that consumes the first power credits. In some examples, the suspendable operation is a program (write) operation in which the channel controller 104 programs or writes data to one or more pages of one or more of the memory banks 134 and 136 operatively coupled to the channel controller 104 via the memory channel 138. In some examples, the suspendable operation is an erase operation in which the channel controller 104 erases data from one or more blocks of one or more of the memory banks 134 and 136.

The suspendable operation consumes a given amount of power credits, referred to as the first power credits. Before the suspendable operation can be scheduled at 305, the channel controller 104 sends a request for the first power credits for the suspendable operation to the power manager 150. The channel controller 104 determines that the requested first power credits are granted by the power manager 150 in response to receiving a grant message from the power manager 150 indicating that the requested first power credits have been granted by the power manager 150. The suspendable operation can be scheduled in response to determining that the requested first power credits are granted.

At 310, the channel controller 104 requests additional, second power credits. For example, the channel controller 104 sends a request to the power manager 150 indicating that the channel controller 104 is requesting the second power credits, while the suspendable operation is being performed. As described herein, blocks 310, 315, 320 and 325 (collectively referred to as a "loop") can be performed periodically while the suspendable operation is being performed without interruption to the suspendable operation (until the suspendable operation completes). In some implementations, one or more time delays can be inserted between blocks 310,315, 320 and 325, therefore changing a natural frequency of the loop and its periodicity.

At 315, the channel controller 104 determines whether the requested second power credits are granted by the power manager 150. For example, the channel controller 104 determines that the requested second power credits are granted by the power manager 150 in response to receiving a grant message from the power manager 150 indicating that the requested second power credits have been granted by the power manager 150. The request being granted indicates that sufficient power credits are left in the available power to be used for additional flash operations, such that it is unlikely that a read operation or other types of flash operations are being stalled while the suspendable operation is being performed.

On the other hand, the channel controller 104 determines that the requested second power credits are not granted by the power manager 150 in response to receiving a rejection message from the power manager 150 indicating that the requested second power credits have not been granted by the power manager 150. The request being rejected indicates that the SSD 102 is operating at or close to the power budget, such that it is likely that a read operation or other types of flash operations are being stalled while the suspendable operation is being performed.

By requesting the additional second power credits while the suspendable operation is performed, the channel controller 104 probes the amount of available power and determines a likelihood of stalling without necessarily acquiring knowledge of the actual available power (managed by the power manager 150) or the desired and current power usage of other channels (e.g., the channel 146, which is managed by the channel controller 108).

In response to determining that the requested second power credits are granted (315:YES), the channel controller 104 releases the granted second power credits at 320 and continues the suspendable operation at 325. In other words, in response to determining that the requested second power credits are granted (315:YES), the suspendable operation is not suspended/interrupted, and the requested second power credits are returned to the power manager 150. Accordingly, the channel controller 104 can check if any read operation is stalled without actually suspending the suspendable operation. The method 300 returns to block 310, in which the channel controller 104 periodically requests the additional second power credits while the suspendable operation is being performed.

On the other hand, in response to determining that the requested second power credits are not granted (315:NO), the channel controller 104 suspends the suspendable operation and releases the first power credits, at 330. The channel controller 104 suspends the suspendable operation by using a suspend command. In some examples, in response to determining that the requested second power credits are not granted (315:NO), the channel controller 104 may request the NAND controller 130 to identify the suspendable operations that are currently being executed on the memory banks on channels CH0 138 and CH1 146, which may instruct channel controllers 104 and 108 to suspend one or more of the identified suspendable operations.

In response to the suspendable operation being suspended and the first power credits being released, the channel controller 104 re-requests the first power credits for the suspended suspendable operation, at 335. This may occur immediately after block 330 (without delay) or after some short suitable delay in order to give some time for any queued read operation to be granted any requested power credits, which may occur at a time between blocks 330 and 335. The time at which the read operation is granted the power credits is denoted by B*. For example, the channel controller 104 sends a request to the power manager 150 indicating that the channel controller 104 is requesting the first power credits for the suspendable operation while the suspendable operation is suspended. In the examples in which multiple suspendable operations are suspended and their associated power credits released, the power credits for all suspended suspendable operations are requested at 335.

At 340, the channel controller 104 determines whether the requested first power credits are granted by the power manager 150. For example, the channel controller 104 determines that the requested first power credits are granted by the power manager 150 in response to receiving a grant message from the power manager 150 indicating that the requested first power credits have been granted by the power manager 150. In response to determining that the first power credits are not granted (340:NO), the method 300 returns to block 335, in which the channel controller 104 repeats requesting the first power credits for the suspended operation.

On the other hand, in response to determining that the requested first power credits are granted by the power manager 150 (340:YES), the channel controller 104 resumes the suspended suspendable operation at 345. The request being granted indicates that sufficient power credits are left in the available power to be used for additional flash operations, such as a read operation.

After releasing the first power credits in block 330 and before block 335, at point B*, power credits become available to be granted to any stalled a read operation, which corresponds to point B* in FIG. 2B where power credits become granted (285:YES). Therefore, the first power credits being released in block 330 (FIG. 3) following the suspending of the suspendable operation may result in power credits being granted (285:YES, FIG. 2B) for a read operation stalled in the loop of blocks 280 and 285 (FIG. 2B). By suitable adjustment of the periodicity of requesting/releasing additional power credits (at blocks 310 and 330 in FIG. 3), the maximum latency of any read command waiting in the loop of blocks 280 and 285 in FIG. 2B can be controlled.

Following the power credits being granted (285:Yes, FIG. 2b), the channel controller 104 schedules the read operation in step 290 and once the read operation completes, the channel controller 104 releases the power credits of the read operation.

The read operation includes reading data from one or more pages of one or more of the memory banks 134 and 136. In some examples, the channel controller 104 (e.g., a scheduler thereof) fetches a next unscheduled flash operation (e.g., the read operation) in a memory channel queue, and sends a request for power credits needed by the read operation to the power manager 150. Given that the suspendable operation is suspended and that the first power credits are released, sufficient power credits are left in the available power to allow the read operation to proceed. In response to receiving a grant message from the power manager 150 indicating that the requested power credits for the read operation have been granted by the power manager 150, the channel controller 104 performs the read operation. In other words, the read operation is scheduled using the first power credits released at 330.

After the read operation completes and its power credits released at 295, the channel controller 104 may be granted the first power credits at 340. The power credits needed to perform the remainder of the suspended suspendable operation may be the same as or less than the first power credits requested prior to the suspendable operation is scheduled at 305. The channel controller 104 determines that the requested power credits are granted by the power manager 150 in response to receiving a grant message from the power manager 150 indicating that the requested power credits have been granted by the power manager 150 (340:YES). The channel controller 104 resumes the suspended suspendable operation at 345 after the requested power credits are granted by the power manager 150. After the suspendable operation is resumed and before the suspendable operation completes, the method 300 returns to block 310, thus performing a loop such that the channel controller 104 periodically requests the additional second power credits.

Accordingly, the channel controller 104 can assess whether the SSD 102 is operating at or close to the power budget by periodically releasing/re-requesting power credits (at blocks 220 and 230) or periodically requesting/releasing additional second power credits (at blocks 310 and 320). In that regard, the periodicity of releasing/re-requesting power credits or requesting/releasing additional second power credits can be used to determine a maximum latency of read operations due to power credit starvation.

Figure 4:
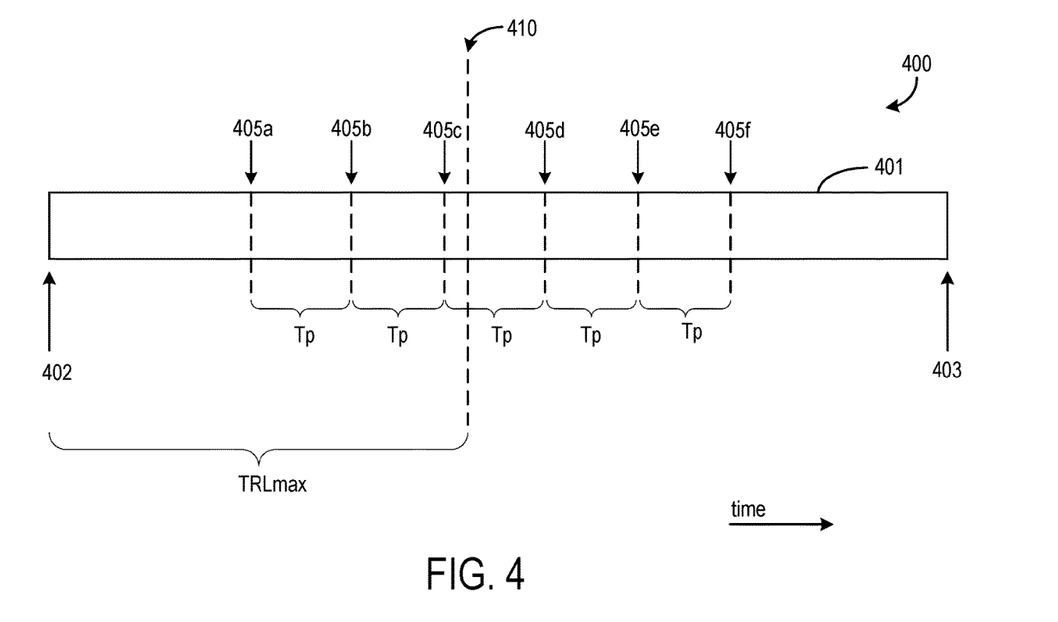
FIG. 4 is a schematic diagram illustrating an example process for scheduling flash operations in an SSD, according to some implementations.

FIG. 4 is a schematic diagram illustrating an example process 400 for scheduling flash operations in the SSD 102 (FIG. 1), according to some implementations. Referring to FIGS. 1-4, a suspendable operation 401 is scheduled (per 210 or 305) at 402 and ends at 403. The channel controller 104 periodically assesses the available power in the manner described (e.g., releases/re-requests power credits or requests/releases additional second power credits) at various points denoted as 405a-405f during the program or erase operation 401, after the program or erase operation 401 begins and before the program or erase operation 401 ends. The periodicity, which is the time interval between two adjacent releases/re-requests for power credits or between two adjacent requests for additional second power credits, is denoted as Tp.

In some implementations, the channel controller 104 can receive an indication of the amount of the available power from the power manager 150. For example, each power credit request that the channel controller 104 sends to the power manager 150 can contain a request for an indication of the amount of the available power, such that the power manager 150 can send the indication of the amount of the available power to the channel controller 104 in the grant message. The amount of the available power is referred to as power credits remaining (PCR).

In some implementations, in response to the channel controller 104 determining that the PCR is below a threshold, the channel controller 104 begins to assess the available power periodically after the suspendable operation begins at 402. In some examples, channel controller 104 begins to assess the available power no longer than a maximum read latency TRLmax after the suspendable operation begins at 402. That is, the first instance (405a) in which the channel controller 104 assess the available power is before TRLmax after the suspendable operation begins at 402. The TRLmax is a maximum read latency threshold allowable by the host 112. The channel controller 104 may begin periodic assessment of the available power after TRLmax or in response to PCR falling below a first safe threshold, whichever is the sooner. The channel controller 104 may pause the periodic assessment of the available power for a period of time no longer than TRLmax, whereupon it resumes periodically assessing the available power. As such, an overhead for assessing the available power can be reduced while guaranteeing the maximum read latency, as the periodic assessment is only performed in response to the PCR being sufficiently low (e.g., below the first safe threshold) that read operations may be stalled, or in response to determining that TRLmax time has elapsed since the last periodic check.

In some implementations, Tp is a predetermined, static value. In other implementations, Tp can be determined dynamically by the channel controller 104 based on the PCR received from the power manager 150. For example, Tp can be proportional to the PCR. In some examples, a minimum Tpmin can also be applied. Tpmin represents the condition that the periodicity by which the assessment of available power is performed does not need to be shorter than a minimum time interval. To illustrate, Tp can be determined using the following expression:

$$Tp = K \times PCR; \text{ if } Tp < Tp\text{min}, \text{ then } Tp = Tp\text{min} \quad (2).$$

K is a constant. A program (write) operation can have a cycle time of TOPprog and a minimum program suspend time of TSUSprog. In some implementations, in response to the channel controller 104 determining that expression (3) is true, the channel controller 104 assesses the available power with periodicity Tp after the suspendable operation 401 (which is a program operation in this case) starts at 402 and before the suspendable operation 401 ends at 403.

$$Tp\text{min} < Tp < TOPprog - TSUSprog \quad (3).$$

In response to the channel controller 104 determining that expression (3) is false, the channel controller 104 does not assess the available power during the suspendable operation 401. Given that TSUSprog represents a response time from requesting suspension of the program operation to actual suspension of the program operation, it is cost-inefficient for the channel controller 104 to suspend the program operation if the program operation will complete anyway within TSUSprog.

In some implementations, during the suspendable operation 401, the channel controller 104 can relax the frequency of assessing the available power (decreasing the length of Tp) as PCR increases and decrease the frequency of assessing the available power (increasing the length of Tp) as PCR decreases. For example, the constant K in expression (2) can be adjusted such that, for example, Tp can vary between Tpmin and TRLmax. Accordingly, the length of Tp during the suspendable operation 401 can vary based on PCR.

In some implementations, the channel controller 104 can prevent the suspendable operation 401 from initiating (by preventing the scheduling of the suspending operation 401), unless the PCR received from the power manager 150 can support N simultaneous read operations to be performed in addition to the suspendable operation 401. For example, channel controller 104 can allow the suspendable operation 401 to be scheduled responsive to determining that the following expression is true:

$$PCR \geq PCpe + N \times PCr \quad (4);$$

where PCpe represents the power credits consumed by the suspendable operation (e.g. a program or erase operation) 401, and PCr represents the power credits consumed by a read operation.

Figure 5:
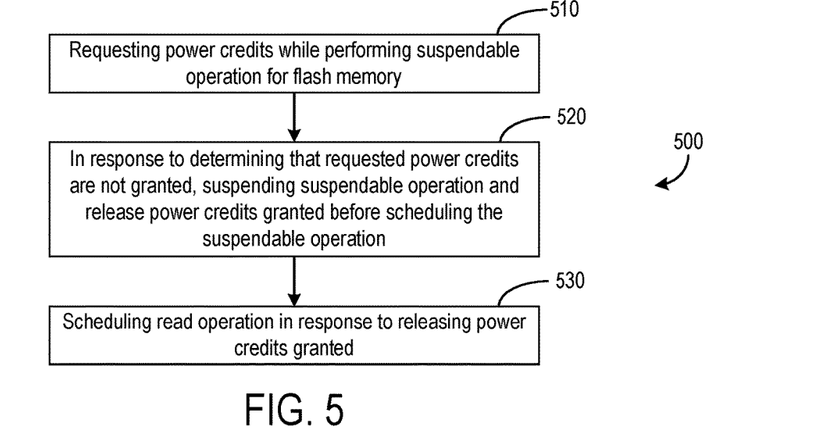
FIG. 5 is a flow diagram illustrating an example process for scheduling flash operations in an SSD, according to some implementations.

FIG. 5 is a flow diagram illustrating an example process 500 for scheduling flash operations in the SSD 102 (FIG. 1), according to some implementations. Referring to FIGS. 1-5, the process 300 is an example implementation of the process 500.

At 510, the channel controller 104 requests power credits from the power manager 150 while performing a suspendable operation (e.g., the suspendable operation 401) for the flash memory 120. In some examples, the power credits are periodically requested while performing the suspendable operation. The channel controller 104 can determine a periodicity by which the power credits are requested based on an available power of the SSD. In some examples, the periodicity increases as the available power increases. In some examples, the suspendable operation is a program operation, and a periodicity by which the power credits are requested is determined based on a cycle time TOPprog of the program operation and a minimum program suspend time TSUSprog of the program operation. In some examples, in response to the channel controller 104 determining that an available power of the SSD is below a threshold, the channel controller 104 requests the power credits. In some examples, the channel controller 104 requests the power credits no longer than a maximum read latency TRLmax after the suspendable operation is initiated.

At 520, in response to determining that the requested power credits are not granted, the channel controller 104 suspends the suspendable operation and releases the power credits granted before scheduling the suspendable operation.

At 530, a channel controller (which may be a channel controller different from the channel controller 104) schedules a read operation in response to suspending the suspendable operation. The channel controller 104 resumes the program or erase operation in response to completing the read operation.

In some implementations (e.g., the process 300), the power consumed by the P/E suspendable operation is represented by first power credits. The first power credits for the suspendable operation are requested and granted (not shown) before the suspendable operation is scheduled (e.g., at 305). Next, second power credits are requested while performing the suspendable operation (e.g., at 310). The second power credits are requested in addition to the first power credits. In response to determining that the requested second power credits are granted (e.g., 315:YES), the channel controller 104 releases the second power credits (e.g., at 320), and the suspendable operation continues (e.g., at 325). In response to determining that the requested second power credits are not granted (e.g., 315:NO), the channel controller 104 suspends the suspendable operation and releases the first power credits (e.g., at 330). In response to the first power credits being released, a read operation may be scheduled (at B*). The channel controller 104 next requests the first power credits for the suspended suspendable operation (e.g., at 335). In response to determining that the first power credits are granted (e.g., 340:YES), the channel controller 104 resumes the suspendable operation (e.g., at 345).

Figure 6:
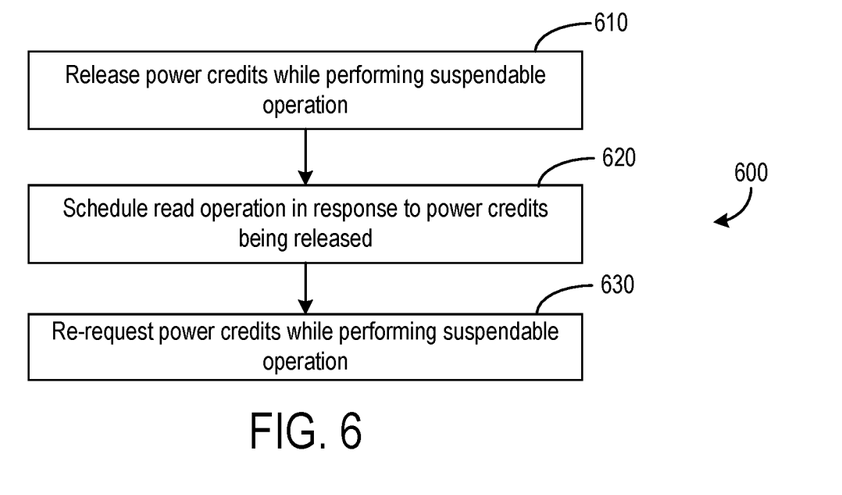
FIG. 6 is a flow diagram illustrating an example process for scheduling flash operations in an SSD, according to some implementations.

FIG. 6 is a flow diagram illustrating an example process 600 for scheduling flash operations in the SSD 102 (FIG. 1), according to some implementations. Referring to FIGS. 1-6, the process 200 is an example implementation of the process 600.

At 610, the channel controller 104 release power credits while performing a suspendable operation. At 620, a channel controller (which may be a channel controller different from the channel controller 104) schedules a read operation in response to power credits being released. At 630, the channel controller 104 re-requests the power credits while performing the suspendable operation (e.g., at A*).

In some implementations (e.g., the process 200), the power credits represent power consumed by the suspendable operation. Power credits for the suspendable operation are requested and granted (not shown) before the operation is scheduled (e.g., at 210), and the power credits for the suspendable operation is released (e.g., at 220) and re-requested (e.g., at 230). In response to determining that the re-requested power credits are granted (e.g., 240:YES), the suspendable operation continues and is uninterrupted (e.g., at 250) and control returns to 220.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storages, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method of preventing stalling of flash memory read operations, comprising:
scheduling a suspendable operation to a flash memory device, the suspendable operation consuming first power credits;
requesting second power credits while the flash memory device performs the suspendable operation;
determining whether or not the request for second power credits is granted;
in response to determining that the requested second power credits are granted, releasing the second power credits and the suspendable operation continues; and
in response to determining that the requested second power credits are not granted, suspending the suspendable operation and releasing the first power credits of the suspendable operation, scheduling a read operation in response to releasing the first power credits of the suspendable operation, re-requesting the first power credits of the suspendable operation, and upon determining that the re-requested first power credits of the suspendable operation are granted, resuming the suspendable operation.

2. The method of claim 1 wherein the suspendable operation is a program operation or an erase operation.

3. The method of claim 1, wherein the second power credits are periodically requested while the flash memory device performs the suspendable operation.

4. The method of claim 3, further comprising determining a periodicity by which the second power credits are requested based on an available power of the SSD.

5. The method of claim 4, wherein the periodicity increases as the available power increases.

6. The method of claim 3, wherein
the suspendable operation is a program operation; and
the method further comprising determining a periodicity by which the power credits are requested based on a cycle time of the program operation and a minimum program suspend time of the program operation.

7. The method of claim 1, wherein the power credits are requested no longer than a maximum read latency after the suspendable operation is scheduled.

8. A method of preventing stalling of flash memory operations, comprising:
scheduling a suspendable operation to a flash memory device, the suspendable operation consuming power credits;
releasing the power credits;
re-requesting the power credits of the suspendable operation, wherein the re-requested power credits are in connection with performance of the suspendable operation; and
determining whether or not the re-request for power credits is granted.

9. The method of claim 8 wherein the suspendable operation is a program operation or an erase operation.

10. The method of claim 8, wherein in response to determining that the re-requested power credits are not granted, the suspendable operation is suspended.

11. The method claim 8, further comprising in response to determining that the re-requested power credits are granted:
determining whether the suspendable operation has been suspended; and
at least one of:
continuing the suspendable operation in response to determining the suspendable operation is not suspended; or
resuming the suspendable operation in response to determining the suspendable operation is suspended.

12. The method of claim 8, wherein a read operation is performed using the released power credits.

13. A Solid State Drive (SSD), comprising:
a controller; and
a flash memory device comprising a plurality of memory banks, wherein the controller:
releases power credits representing power consumed by a suspendable operation while one of the plurality of memory banks performs the suspendable operation;
re-requests the power credits of the suspendable operation;
at least one of:
in response to determining that the re-requested power credits are granted, resumes or continues the suspendable operation; or
in response to determining that the re-requested power credits are not granted, suspends the suspendable operation; and
schedules a read operation in response to releasing the power credits.

14. The SSD of claim 13, wherein the suspendable operation is a program operation or an erase operation.

15. The SSD of claim 13, wherein the controller further:
determines whether the suspendable operation has been suspended in response to determining that the re-requested power credits are granted; and
at least one of:
continues the suspendable operation in response to determining the suspendable operation is not suspended; or
resumes the suspendable operation in response to determining the suspendable operation is suspended.

16. A Solid State Drive (SSD), comprising:
a controller; and
a flash memory device comprising a plurality of memory banks, wherein the controller:
schedules a suspendable operation to the flash memory device, the suspendable operation consuming first power credits;
requests second power credits while the flash memory device performs the suspendable operation;
determines whether or not the request for second power credits is granted;
in response to determining that the requested second power credits are granted, releases the second power credits and continues the suspendable operation; and
in response to determining that the requested second power credits are not granted, suspends the suspendable operation and releases the first power credits of the suspendable operation, schedules a read operation in response to releasing the first power credits of the suspendable operation, re-requests the first power credits of the suspendable operation, and upon determining that the re-requested first power credits of the suspendable operation are granted, resumes the suspendable operation.

17. The SSD of claim 16, wherein the second power credits are periodically requested while the flash memory device performs the suspendable operation.

18. The SSD of claim 16, wherein the power credits are requested no longer than a maximum read latency after the suspendable operation is scheduled.

19. A non-transitory computer-readable medium storing computer-readable instructions, such that when executed, causes a controller of a Solid State Drive (SSD) to:
schedule a suspendable operation to a flash memory device, the suspendable operation consuming first power credits;
request second power credits while the flash memory device performs the suspendable operation;
determine whether or not the request for second power credits is granted;
in response to determining that the requested second power credits are granted, release the second power credits and continue the suspendable operation; and
in response to determining that the requested second power credits are not granted, suspend the suspendable operation and release the first power credits of the suspendable operation, schedule a read operation in response to releasing the first power credits of the suspendable operation, re-request the first power credits of the suspendable operation, and upon determining that the re-requested first power credits of the suspendable operation are granted, resume the suspendable operation.

20. A non-transitory computer-readable medium storing computer-readable instructions, such that when executed, causes a controller of a Solid State Drive (SSD) to:
schedule a suspendable operation to a flash memory device, the suspendable operation consuming power credits;
release the power credits;
re-request the power credits, wherein the re-requested power credits are in connection with performance of the suspendable operation; and
determine whether or not the re-request for power credits is granted.

* * * * *

UNITED STATES PATENT AND TRADEMARK OFFICE
CERTIFICATE OF CORRECTION

PATENT NO. : 11,321,022 B2
APPLICATION NO. : 16/731766
DATED : May 3, 2022
INVENTOR(S) : Neil Buxton and Gary James Calder

Page 1 of 1

It is certified that error appears in the above-identified patent and that said Letters Patent is hereby corrected as shown below:

On the Title Page

Item (72) Inventors, the inventors' residence information should be listed as follows:
"Neil Buxton, Berkshire, (GB)
Gary James Calder, Hants, (GB)"

Signed and Sealed this
Eighth Day of November, 2022

Katherine Kelly Vidal
*Director of the United States Patent and Trademark Office*